(12) United States Patent
Wu

(10) Patent No.: US 9,676,177 B2
(45) Date of Patent: Jun. 13, 2017

(54) MULTI-STATION NON-STOP PRINTING PROCESSING SYSTEM AND PROCESSING TECHNIQUE

(71) Applicants: MARKETING MANUFACTURING & TECHNOLOGY(SHANGHAI)CO., LTD., Shanghai (CN); Teh-Ming Wu, Shanghai (CN)

(72) Inventor: Teh-Ming Wu, Shanghai (CN)

(*) Notice: Subject to any disclaimer, the term of this patent is extended or adjusted under 35 U.S.C. 154(b) by 0 days.

(21) Appl. No.: 15/121,387

(22) PCT Filed: Feb. 6, 2015

(86) PCT No.: PCT/CN2015/000082
§ 371 (c)(1),
(2) Date: Aug. 25, 2016

(87) PCT Pub. No.: WO2015/127826
PCT Pub. Date: Sep. 3, 2015

(65) Prior Publication Data
US 2016/0361917 A1    Dec. 15, 2016

(30) Foreign Application Priority Data
Feb. 25, 2014  (CN) .......................... 2014 1 0063022

(51) Int. Cl.
B41F 23/00    (2006.01)
B41F 21/00    (2006.01)
(Continued)

(52) U.S. Cl.
CPC ............ B41F 21/00 (2013.01); B29C 59/026 (2013.01); B29C 59/04 (2013.01);
(Continued)

(58) Field of Classification Search
CPC ...... B41F 23/00; B41F 23/08; B41F 16/0006; B41F 16/00; B41F 19/062; B41F 19/06;
(Continued)

(56) References Cited

U.S. PATENT DOCUMENTS

| 5,603,259 A | 2/1997 | Gross et al. |
| 2007/0144391 A1* | 6/2007 | Kuckelmann ....... B41F 33/0081 101/485 |

(Continued)

FOREIGN PATENT DOCUMENTS

| CN | 2491225 Y | 5/2002 |
| CN | 1356211 A | 7/2002 |

(Continued)

OTHER PUBLICATIONS

Machine translation of CN101092073 to Wu published on Dec. 26, 2007.*

*Primary Examiner* — Blake A Tankersley
(74) *Attorney, Agent, or Firm* — Gokalp Bayramoglu

(57) ABSTRACT

The invention relates to a non-stop printing processing system with a plurality of stations, comprising a first processing unit and second processing unit; each of the processing units comprises a set of film supply devices, a pressure roller, a stripped roller and a cured device; the pressure roller, the stripped roller and the cured device are mounted by a lift type; the system comprises an impression barrel, when a substrate is processed, the impression barrel is positioned under the substrate, a processed substrate is positioned between a processing unit processing the substrate and the impression barrel. The invention also relates to a non-stop printing process with a plurality of stations. The invention utilizes one or more film supply devices of a processing device to alternately supply a film to achieve the effect of automatic roll change and simulation positioning.

14 Claims, 8 Drawing Sheets

(51) Int. Cl.
*B41F 23/04* (2006.01)
*B41F 23/08* (2006.01)
*B29C 59/04* (2006.01)
*B29C 59/02* (2006.01)
*B41F 16/00* (2006.01)

(52) U.S. Cl.
CPC ...... *B41F 16/0026* (2013.01); *B41F 16/0033* (2013.01); *B41F 23/0409* (2013.01); *B41F 23/0453* (2013.01); *B41F 23/08* (2013.01)

(58) Field of Classification Search
CPC .. B41F 19/02; B41F 23/0409; B41F 23/0453; B41M 7/0045; B44C 1/18; B44C 1/20; B44C 1/24; B29C 59/04; B29C 59/046; B29C 59/026
See application file for complete search history.

(56) References Cited

U.S. PATENT DOCUMENTS

| | | | |
|---|---|---|---|
| 2009/0000745 A1* | 1/2009 | Hirokawa | B41F 23/08 156/379.6 |
| 2009/0078137 A1* | 3/2009 | Yamashita | B41F 19/062 101/217 |
| 2011/0067588 A1* | 3/2011 | Rancourt | B41F 13/12 101/248 |

FOREIGN PATENT DOCUMENTS

| | | |
|---|---|---|
| CN | 1583407 A | 2/2005 |
| CN | 2719578 Y | 8/2005 |
| CN | 2721392 Y | 8/2005 |
| CN | 103264575 B | 9/2005 |
| CN | 1299900 C | 2/2007 |
| CN | 2908152 Y | 6/2007 |
| CN | 101092073 A | 12/2007 |
| CN | 201012556 Y | 1/2008 |
| CN | 201253988 Y | 6/2009 |
| CN | 101100144 C | 3/2010 |
| CN | 101486270 B | 7/2010 |
| CN | 101927622 A | 12/2010 |
| CN | 101480890 B | 4/2011 |
| CN | 201949999 U | 8/2011 |
| CN | 1814445 B | 9/2011 |
| CN | 101239527 B | 11/2011 |
| CN | 102248762 A | 11/2011 |
| CN | 202319270 U | 7/2012 |
| CN | 103129116 A | 6/2013 |
| CN | 103332008 A | 10/2013 |
| CN | 103818110 A | 5/2014 |
| CN | 203805476 U | 9/2014 |
| GB | 2368313 B | 3/2004 |

* cited by examiner

MULTI-STATION NON-STOP PRINTING PROCESSING SYSTEM AND PROCESSING TECHNIQUE

TECHNICAL FIELD

The present invention relates to the field of machinery equipment for printing-packaging and material processing, and specifically relates to a multi-station non-stop printing processing system and processing technology.

BACKGROUND

At present, in the field of printing-packaging and material processing, there are many technologies for surface processing, including glossing, hot stamping and the like. The basic definition of glossing is to cover the printed surface with a transparent material so as to fulfill the purpose of protecting and strengthening the decoration effect. There are various glossing technical means, for example, a calendaring technology for heating and pressing the dried coating surface in order to improve the smoothness of the surface, a technology for coating the surface with a matte effect in order to improve the elegant effect, and even a technology in which a mold must be made additionally, and embossing and casting devices are used in cooperation to perform embossing and casting on the surface of a printed object, in order to realize fine embossing and transparent holographic processing on the surface of a material. These technologies have respective characteristics, and can protect materials or printed images or enhance the visual effect. In addition, the hot stamping technology is extensively used in the industries of packaging, printing and the like, and is often used on presswork or packages by multiple processing procedures. Thus, the glossing and hot stamping technologies are widely applied to surface processing of presswork of packaging decoration, albums, large decorative pictorial posters and the like. However, in the surface processing process, when the entire surface or a specified area of a material or a printed surface is processed with a specific coating by a specific coating procedure (e.g., offset printing, gravure printing, flexible printing, screen printing, etc.), a substantially consistent surface effect may appear, an entirely "Matte surface" or entirely "bright surface" effect. If a granular or embossed surface effect appears, even if the granular or embossed effect is not completely identical, it substantially can still be regarded as a random effect that the same texture instead of a positioning image appears in the specified area. In the print surface processing technologies pointed out in Chinese patent applications 01142655.1, 200410024849.9, 200420023306 and 200420071245.5, equipment can only achieve the surface effect of the same random texture on the different specified areas of a base material by single procedure as mentioned above. Moreover, in the aspect of cold stamping, the disclosed patents including Chinese patent applications 200610006830.0, 200620060491.X, 201110137504.4, 201110378502.4, 201310128775.2, 01242885.X, 200710075411.7 and 201010231830.7. British patent application GB2368313, U.S. Pat. No. 5,603,259 and the like do not disclose any content of stretching and positioning embossed or stamped films to meet the requirement for accurate positioning.

In the past, if more than one positioning glossing or hot stamping effect is to be achieved on the surface of the same material by surface processing, the specified areas of the surface of the material must be processed by the procedures corresponding to the effects in number. For example, the surface of the same base material must achieve three different effects including a bright surface effect, a matte effect and a holographic effect. Or, the surface of the same base material must have three different effects including gold stamping, silver stamping and laser stamping. For this problem, the disclosed Chinese patent application 200710044182.2 achieves accurate positioning by adopting a film stretching device and an electric eye positioning device, in view of the limitation of the above technology or the material itself and the problem that more than one station is needed for carrying out more than one processing procedure to achieve more than one different effect, so that the purpose of continuous glossing or hot stamping is achieved. Meanwhile, the problems that the current equipment or system, whether for glossing or hot stamping, available on the market has only a single function and each has more than one defect are solved.

Although the disclosed Chinese patent application 200710044182.2 can reduce the procedures by using the positioning function, the problems of time and material waste caused by stop and labor waste caused by reel change are still present. In today's increasingly fiercer competition, the costs of labor and materials are increasingly higher as time is very precious. Therefore, it is very necessary to develop an invention capable of solving the problems of low production efficiency, high production cost, high rejection rate and the like caused by stop for reel change.

SUMMARY OF THE INVENTION

An object of the present invention is to overcome the shortcomings of the prior art, combine the technologies of different fields of processing machinery, automatic control and the like, and provide a multi-station non-stop printing processing system and processing technology. The processing system can cast or cold-stamp the texture or evaporated layer of a film onto a base material without stop to save labor, reduce the loss and improve the efficiency; equipment, due to its small size, can be combined with and incorporated to the current single-piece or web-fed printing equipment or glossing machine production line to achieve the advantages of reducing procedures, reducing the production cost and time and improving the production efficiency; in addition, the processing system also has a positioning processing function.

The present invention solves the technical problems by adopting the following technical solutions:

A multi-station non-stop printing processing system includes a first processing unit, a second processing unit and an impression cylinder, wherein each processing unit includes an independent set of a film supply device, a pressure roller, a stripping roller and a curing device, each film supply device includes a reeling device and an unreeling device which are independently driven and can rotate forwardly and reversely, and the pressure roller, the stripping roller and the curing device are installed in a lifting manner; when a base material is processed, the impression cylinder is located below the base material, and the processed base material is located between the processing units for processing the base material and the impression cylinder.

Further, in the printing processing system described above, the number of the impression cylinder is one, and the first processing unit and the second processing unit share the impression cylinder.

Further, in the printing processing system described above, the impression cylinder includes a first impression cylinder and a second impression cylinder, the first processing unit uses the first impression cylinder, and the second processing unit uses the second impression cylinder.

Further, in the printing processing system described above, each processing unit further includes a main wallboard and a secondary wallboard, the secondary wallboard can move on the main wallboard, and the pressure roller, the stripping roller and the curing device in each processing unit are all installed on the respective secondary wallboard.

Further, in the printing processing system described above, a slide rail is arranged between the main wallboard and the secondary wallboard, and the secondary wallboard moves up and down by means of a lifting control device in cooperation with the slide rail, so that the film processed by each independent processing unit and the impression cylinder can conveniently run in different directions without rubbing because the secondary wallboard can move up and the film can thus be separated from the impression cylinder.

Further, in the printing processing system described above, the curing device is fixedly installed on the secondary wallboard.

Further, in the printing processing system described above, each processing unit further includes a pressure roller lifting control device and a stripping roller lifting control device, and through the pressure roller lifting control device and the stripping roller lifting control device, the pressure roller and the stripping roller can be respectively installed on the secondary wallboard in a lifting manner.

Further, in the printing processing system described above, each lifting control device can be a cylinder, a mechanical cam or an electronic cam.

Further, in the printing processing system described above, the film supply device in each processing unit is provided with a positioning stretching device between the pressure roller and the reeling device and a positioning stretching device between the pressure roller and the unreeling device to ensure the stable tension of films in the reeling and unreeling directions.

Further, in the printing processing system described above, the first processing unit is provided with at least one positioning stretching device for a film with a recognizable positioning mark or/and a different texture, and the at least one positioning stretching device forms a positioning processing system.

Further, in the printing processing system described above, the second processing unit is provided with at least one positioning stretching device for a film with a recognizable positioning mark or/and a different texture, and the at least one positioning stretching device forms a positioning processing system.

Further, in the printing processing system described above, the positioning stretching device includes a first electric eye device, a first group of self-powered compaction rollers and a second group of self-powered compaction rollers, wherein the first electric eye device is a positioning or electric eye device capable of detecting the recognizable positioning mark and the edge of the film, the two compaction rollers in the first group press against each other and rotate at the velocity smaller than or equal to the linear velocity of the impression cylinder, and the two compaction rollers in the second group press against each other.

Further, in the printing processing system described above, each processing unit is installed through connection with one or more web-fed printing devices, single-piece printing devices or coating unit devices.

Further, in the printing processing system described above, when the processing unit is connected with one single-piece printing device, the gripping teeth on the impression cylinder of the processing unit adopt the ones with vacuum negative pressure adsorption devices.

Further, the printing processing system described above is configured to work according to the following steps: 1, the first processing unit is thrown on to the impression cylinder for processing, at the moment, the unreeling device of the first processing unit unreels and the reeling device of the first processing unit reels, and the second processing unit is thrown off the impression cylinder and stands by; step 2, the first processing unit is still thrown on to the impression cylinder for processing, at the moment, the unreeling device of the second processing unit unreels, the reeling device of the second processing unit reels, and the second processing unit is prepared to be thrown on to the impression cylinder; step 3, the second processing unit is thrown on to the impression cylinder for processing, the unreeling device of the second processing unit unreels and the reeling device of the second processing unit reels, the first processing unit is thrown off the impression cylinder and re-reels, and the reeling device of the first processing unit unreels and the unreeling device reels at the moment: step 4, the second processing unit is still thrown on to, the impression cylinder for processing, at the moment, the unreeling device of the first processing unit unreels, the reeling device of the first processing unit reels, and the first processing unit is prepared to be thrown on to the impression cylinder; step 5, the first processing unit is thrown on to the impression cylinder for processing, the unreeling device of the first processing unit unreels and the reeling device of the first processing unit reels, the second processing unit is thrown off the impression cylinder and re-reels, and the reeling device of the second processing unit unreels and the unreeling device of the second processing unit reels at the moment; and steps 1 to 5 are repeated cyclically.

Further, the printing processing system described above is configured as follows: in step 2, when the unreeling, device in the first processing unit is to unreel to the proximity of the axis and the reeling device is to fully reel, the unreeling device and the reeling device in the second processing unit are accelerated, until the second processing unit is thrown on to the impression cylinder when the linear velocity of the film is same as that of the revolving speed of the impression cylinder; and in step 4, when the unreeling device in the second processing unit is to unreel to the proximity of the axis and the reeling device is to fully reel, the unreeling device and the reeling device in the first processing unit are accelerated, until the first processing unit is thrown on to the impression cylinder when the linear velocity of the film is same as that of the revolving speed of the impression cylinder.

Further, the printing processing system described above is configured to work in the following manner: a base material is conveyed or dragged to the first processing unit, the pressure roller of the first processing unit comes into fit with the impression cylinder, that is, the first processing unit is thrown on to the impression cylinder, the film supplied by the unreeling device of the first processing unit comes into fit with the base material at the rotating junction of the pressure roller of the first processing unit and the impression cylinder, and the reeling device in the first processing unit strips the film off the surface of the base material and rolls back; when the unreeling device in the first processing unit is to unreel to the proximity of the axis and the reeling device is to fully reel, the unreeling device and the reeling device in the second processing unit are accelerated, and when the linear velocity of the film is same as that of the revolving speed of the impression cylinder, the pressure roller, the stripping roller and the curing device fixed on the secondary wallboard of the second processing unit simultaneously descend, so that the pressure roller comes into fit with the impression cylinder, that is, the second processing unit is thrown on to the impression cylinder; at the moment, the pressure roller, the stripping roller and the curing device fixed on the secondary wallboard of the first processing unit simultaneously ascend; when the secondary wallboard of the first processing unit moves till the straight line between the bottoms of the pressure roller and the stripping roller is higher than the highest point of the impression cylinder, the unreeling device of the first processing unit at the moment accomplishes reeling before unreeling of the unreeling device of the second processing unit is accomplished, and rests and waits for the unreeling device in the second processing unit; and when the unreeling device in the second processing unit is to unreel to the proximity of the axis and the reeling device is to fully reel, the unreeling device of the first processing unit starts unreeling again, so that the processing units cyclically work between the above two phases.

Further, in the printing processing system described above, the film supplied by each film supply device has respective different conveying line.

A multi-station non-stop printing processing technology includes: providing a first processing unit and a second processing unit, wherein each of the provided processing units includes an independent set of a film supply device, a pressure roller, a stripping roller and a curing device; each of the provided film supply devices includes a reeling device and an unreeling device which are independently driven and can rotate forwardly and reversely; installing the provided pressure roller, stripping roller and curing device in a lifting manner; and providing an impression cylinder which is configured such that when a base material is processed, the impression cylinder is located below the base material, and the processed base material is located between the processing units for the base material and the impression cylinder.

Further, the printing processing technology described above further includes: installing the pressure roller, the stripping roller and the curing device in each processing unit onto a secondary wallboard capable of moving on a main wallboard; and providing a slide rail between the main wallboard and the secondary wallboard, so that the secondary wallboard moves up and down by means of a lifting control device in cooperation with the slide rail installed on the main wallboard, and thus, the film processed by each independent processing unit and the impression cylinder can conveniently run in different directions without rubbing because the secondary wallboard can move up and then the film can be separated from the impression cylinder.

Further, the printing processing technology described above further includes: step 1, the first processing unit is thrown on to the impression cylinder for processing, at the moment, the unreeling device of the first processing unit unreels and the reeling device of the first processing unit reels, and the second processing emit is thrown off the impression cylinder and stands by; step 2, the first processing unit is still thrown on to the impression cylinder for processing, at the moment, the unreeling device of the second processing unit unreels, the reeling device of the second processing unit reels, and the second processing unit is prepared to be thrown on to the impression cylinder; step 3, the second processing unit is thrown on to the impression cylinder for processing, the unreeling device of the second processing unit unreels and the reeling device of the second processing unit reels, the first processing unit is thrown off the impression cylinder and re-reels, and the reeling device of the first processing unit unreels and the unreeling device reels at the moment; step 4, the second processing unit is still thrown on to the impression cylinder for processing, at the moment, the unreeling device of the first processing unit unreels, the reeling device of the first processing unit reels, and the first processing unit is prepared to be thrown on to the impression cylinder; step 5, the first processing unit is thrown on to the impression cylinder for processing, the unreeling device of the first processing unit unreels and the reeling device of the first processing unit reels, the second processing unit is thrown off the impression cylinder and re-reels, and the reeling device of the second processing unit unreels and the unreeling device of the second processing unit reels at the moment: and steps 1 to 5 are repeated cyclically.

Further, the printing processing technology described above further includes: in step 2, when the unreeling device in the first processing unit is to unreel to the proximity of the axis and the reeling device is to fully reel, the unreeling device and the reeling device in the second processing unit are accelerated, until the second processing unit is thrown on to the impression cylinder when the linear velocity of the film is same as that of the revolving speed of the impression cylinder; and in step 4, when the unreeling device in the second processing unit is to unreel to the proximity of the axis and the reeling device is to fully reel, the unreeling device and the reeling device in the first processing unit are accelerated, until the first processing unit is thrown on to the impression cylinder when the linear velocity of the film is same as that of the revolving speed of the impression cylinder.

The present invention further relates to a multi-station non-stop printing processing technology, including the following steps: (1) a base material with an uncured coating is conveyed or dragged to the first processing unit, a film material with a surface texture supplied by the unreeling device of the first processing unit comes into fit with the base material completely at the rotating junction of the pressure roller and the impression cylinder, and the first processing unit is located at a position thrown on to the impression cylinder at the moment; and (2) after the plastic film with the surface texture and the base material with the uncured coating pass through the rotating junction of the pressure roller and the impression cylinder, complete fitting of the base station and the film is ensured, the fitted film and base material are conveyed to a position below the curing device, the coating on the base material is cured by the curing device via the plastic film, and the cured coating at the moment is presented on the base material in a manner reverse to the surface texture of the film; then the reeling device in the first processing unit strips the plastic film of the surface of the base material and rolls back; and finally, the base material is conveyed to a device and the base material after surface treatment is conveyed to a reception unit.

The present invention further relates to a multi-station non-stop printing processing technology, including the following steps: (I) a base material with uncured adhesive is conveyed or dragged to the first processing unit by a conveying device or a dragging device, the hot-stamped film supplied by the unreeling device of the first processing unit comes into fit with the base material completely at the rotating junction of the pressure roller and the impression cylinder, and the first processing unit is located at a position thrown on to the impression cylinder at the moment; and (2) after the hot-stamped film and the base material with uncured adhesive pass through the rotating junction of the pressure roller and the impression cylinder, complete fitting of the base station and the hot-stamped film is ensured, the fitted film and base material are conveyed to a position below the curing device, the adhesive on the base material is cured by the curing device via the hot-stamped film, and the cured adhesive at the moment is combined with a sprayed aluminum layer on the surface of the film; then the reeling device in the first processing unit strips the hot-stamped film off the surface of the base material and rolls back, and the sprayed aluminum layer with metal feeling is presented at the original position of the adhesive on the base material at the same time; and finally, the base material is conveyed to a device and the base material after surface treatment is conveyed to a reception unit.

Further, the technology also includes the following steps: when the unreeling device in the first processing unit is to unreel to the proximity of the axis and the reeling device is to fully reel, the system accelerates the unreeling device and the reeling device in the second processing unit by operation of a computer or control of a sensor switch, and when the linear velocity of the film is same as that of the revolving speed of the impression cylinder, the pressure roller, the stripping roller and the curing device fixed on the secondary wallboard of the second processing unit simultaneously descend, so that the pressure roller comes into fit with the impression cylinder, that is, the second processing unit is thrown on to the impression cylinder; at the moment, the pressure roller, the stripping roller and the curing device fixed on the secondary wallboard of the first processing unit simultaneously ascend; when the secondary wallboard till the straight line between the bottoms of the pressure roller and the stripping roller is higher than the highest point of the impression cylinder, the unreeling device of the first processing unit at the moment accomplishes reeling before unreeling of the unreeling device of the second processing unit is accomplished, and rests and waits for the unreeling device in the second processing unit; and when the second processing unit is to accomplish unreeling, the first processing unit starts unreeling again, so that the processing units cyclically work.

Further, the technology also includes the following step: when the base material is too thick so that the pressure roller jumps when the leading edge of the base material enters the junction, the pressure roller can be lifted to the height equivalent to the thickness of the base material under the operation of the computer or the control of the sensor switch before the base material enters the film supply device.

Further, the technology also includes the following step: the processing technology is used in combination with a web-fed printing device, a single-piece printing device or a glossing unit device.

Further, the technology also includes the following step: the first processing unit and the second processing unit share one impression cylinder to interactively perform the above procedures.

Further, the technology also includes the following step: the first processing unit and the second processing unit use respective impression cylinders to interactively perform the above procedures.

In addition to the contents disclosed in other parts of the specification and the contents that those skilled in the art can understand after reading the specification, the advantages and beneficial effects of the present invention at least further include all of or any of the following contents:

1. The multi-station non-stop printing processing system of the present invention has two (more than one) processing units which operate independently, each processing unit has an unreeling device and a reeling device, and each of the reeling and unreeling devices has a respective independent driving mechanism, so that the reeling and unreeling devices can operate independently and rotate forwardly and reversely, and thus functional conversion of unreeling and reeling is realized. The prior art does not give such enlightenment, for example, the existing Chinese patent applications 200910037225.3, 200910037193.7, 200820147297.4, 200810026337.4 and 200420071245.5, and Chinese patent applications 200620041821, 200410015978.1 and 200710044182.2 only involve one unreeling device and one reeling device, the reeling device is only used for reeling, the unreeling device is only used for unreeling, and the driving way of the above reeling and unreeling devices is not mentioned, although Chinese patent application 201120026325.9 mentions a double-station unreeling device and a double-station reeling device, however in two unreeling devices, after the first roll of paper unreels completely, the second roll of paper still travels along the way where the first roll of paper runs, that is, there is only one conveying line, while the present invention differs in that the film in each film supply device has a respective conveying line, so that uninterrupted printing processing is realized, and the present invention is fundamentally different in design thought and makes a geometric level of progress on the technical effects.

2. In the multi-station non-stop printing processing system of the present invention, the pressure rollers, the stripping rollers and the curing devices are all lifting mechanisms and can move up and down, so that automatic reel change is realized without stop. Chinese patent application 200910037225.3 already discloses a clearance adjusting mechanism for adjusting a clearance between a stripping guide roller and a lower throw-on cylinder according to the specific thickness of a printed material and the thickness of a pressed film, but it is used for solving the quality problem in the stripping process. In Chinese Patent application 200710044182.2, a pressure roller can be installed on a secondary wallboard module which can move up till the straight line between the bottoms of the pressure roller and a stripping roller is higher than the highest point of an impression cylinder, but it is intended to solve the problem of avoiding waste or scratch on the uncured part of the surface of the base material when the system is not used or throwing on is not needed, which is different from the intention of the present invention to exchange the rotating directions of the reeling device and the unreeling device and avoiding rubbing between the film and the impression cylinder after the secondary wallboard ascends.

3. hi the multi-station non-stop processing system and processing technology disclosed by the present invention, films are alternatively supplied by the film supply device of more than one processing unit, so that an effect of automatic reel change is realized without stop; moreover, the effect of simulative positioning is provided, thereby solving the problem of time, material and labor waste caused by stop for reel change, reducing the production cost and the rejection rate, and improving the production efficiency; therefore, the system and the technology can be applied to various products with high added values.

LIST OF REFERENCE SIGNS

1—film unreeling device of first processing unit, 2—film reeling device of first processing unit, 3—curing device of first processing unit. 4—pressure roller of first processing unit, 5—stripping roller of first processing unit, 6—impression cylinder, 7—base material with uncured coating, 8—film unreeling device of second processing unit, 9—film reeling device of second processing unit, 10—curing device of second processing unit. 11—pressure roller of second processing unit. 12—stripping roller of second processing unit, 13—second impression cylinder, 14—A group of compaction rollers of first processing unit. 15—first electric eye device of first processing unit, 16—B group of compaction rollers of first processing unit, 18—A group of compaction rollers of second processing unit, 19—first electric eye device of second processing unit, 20—B group of compaction rollers of second processing unit. 22—coating unit, 23—offset printing unit, 24—stripping roller lifting control device, 25—secondary wallboard lifting control device, 26—stripping roller lifting control device, 27—main wallboard, 28—secondary wallboard.

DETAILED DESCRIPTION OF THE EMBODIMENTS

The present invention will be farther described with specific embodiments below, and the following embodiments are only descriptive but not limiting, and the protection scope of the present invention is not limited thereby.

Figure 1:
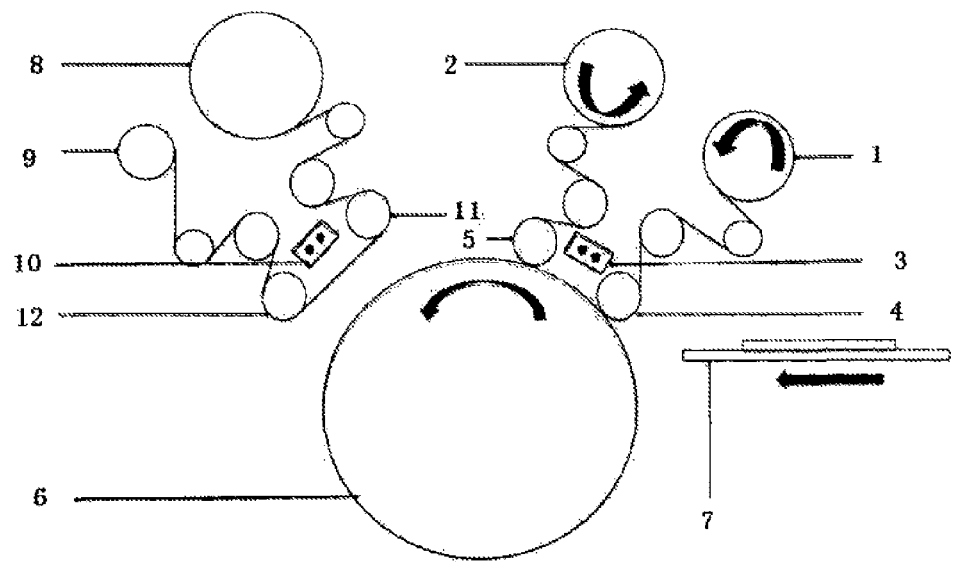
FIG. 1 is a structural schematic diagram of the present invention illustrating the first processing unit is thrown on for processing, the second processing unit is thrown off and stands by, and the first processing unit and the second processing unit share one impression cylinder.

FIG. 1 shows an embodiment of a multi-station non-stop printing processing system disclosed by the present invention. The system includes more than one processing unit, and in this embodiment, the system includes a first processing unit and a second processing unit.

The first processing unit described above includes an independent set of a film supply device, a pressure roller 4, a stripping roller 5 and a curing device 3; and the second processing unit includes an independent set of a film supply device, a pressure roller 11, a stripping roller 12 and a curing device 10. The curing device is located between the respective pressure roller and stripping roller, the curing device is an ultraviolet or electron beam curing device, and the quantity of the curing device can be one or more. Those skilled in the art understand that the stripping roller is used for separating a base material from a film in an unreeling device.

The film supply device of the first processing unit described above includes a reeling device 2 and an unreeling device 1 which are independently driven and can rotate forwardly and reversely; and the film supply device of the second processing unit also includes a reeling device 9 and an unreeling device 8 which are independently driven and can rotate forwardly and reversely. Since the reeling devices and the unreeling devices can rotate forwardly and reversely in two directions, the reeling devices can also unreel, and the unreeling devices can also reel.

Figure 15:
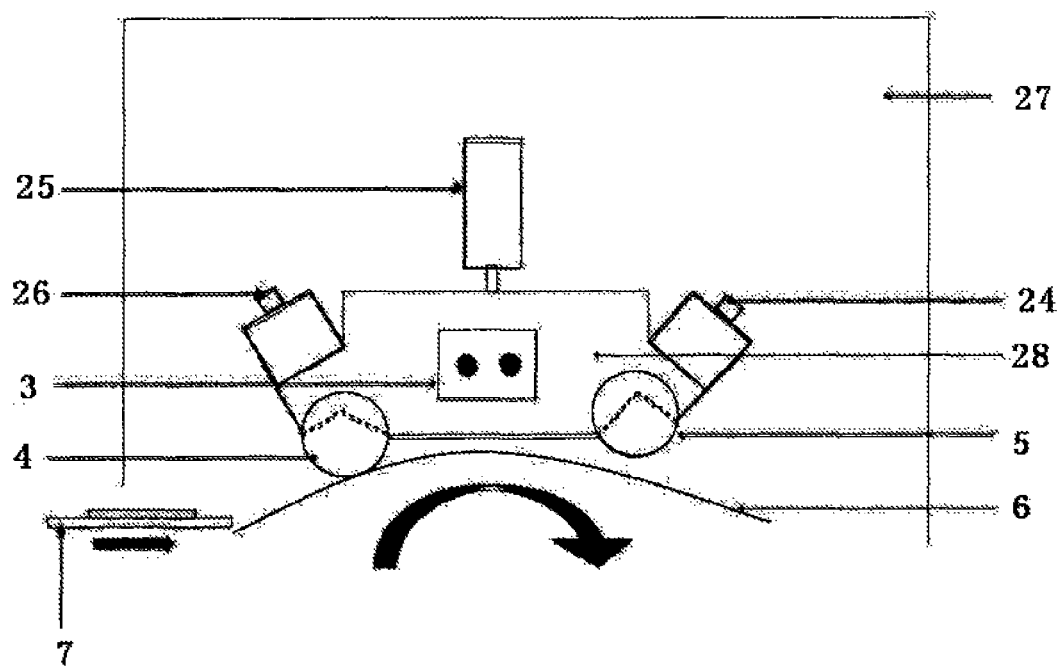
FIG. 15 is an enlarged view of locations of a pressure roller, a stripping roller and a curing device in a processing unit of the present invention.

The pressure rollers, the stripping rollers and the curing devices of the first processing unit and the second processing unit described above are installed in a lifting manner, wherein the lifting installation here indicates ascending and descending is possible relative to the base material to be processed. As shown in FIG. 15, the pressure roller 4, the stripping roller 5 and the curing device 3 in the first processing unit are installed on a group of secondary wallboard 28. The secondary wallboard 28 can move on a main wallboard 27. Exemplarily, a slide rail is arranged between the main wallboard 27 and the secondary wallboard 28, and the secondary wallboard 28 moves up and down by means of a lifting control device 25 in cooperation with the slide rail, installed on the main wallboard 27 to move up and down, that is, the lifting, control device 25 can control the pressure roller, the stripping roller 5 and the curing device 3 to ascend and descend, so that the film in the first processing unit and the impression cylinder can conveniently run in different directions without rubbing because the secondary wallboard 28 can move up and then the film can be separated from the impression cylinder.

Exemplarily, the pressure roller 4 and the stripping roller 5 can be installed on the secondary wallboard 28 via lifting control devices 24 and 26 and thus can independently ascend and descend relative to the secondary wallboard. Setting separate lifting control devices for the pressure roller and the stripping roller at least has the advantage that the lifting positions of the pressure roller and the stripping roller can be independently adjusted without lifting the secondary wallboard, so that the adjustment is more convenient; in addition, providing respective lifting control devices for the secondary wallboard, the pressure roller and the stripping roller can also effectively avoid the problem of poor stability caused by too long a lifting distance when a single lifting device controls lifting. The curing device 3 can be directly fixedly installed on the secondary wallboard 28.

Each lifting control device can be a cylinder, a mechanical cam or an electronic cam. The second processing unit has the same structure as the first processing unit, and thus is not described here. The main wallboards of the two processing units can be the same one or different ones.

The printing processing system of this embodiment further includes an impression cylinder 6 below the base material. In this embodiment, the two processing units share one impression cylinder. When possible, it is particularly advantageous to share one impression cylinder, because it can significantly reduce the size of the printing processing system, facilitate the connection between this system and other unit and greatly reduce the cost.

Figure 5:
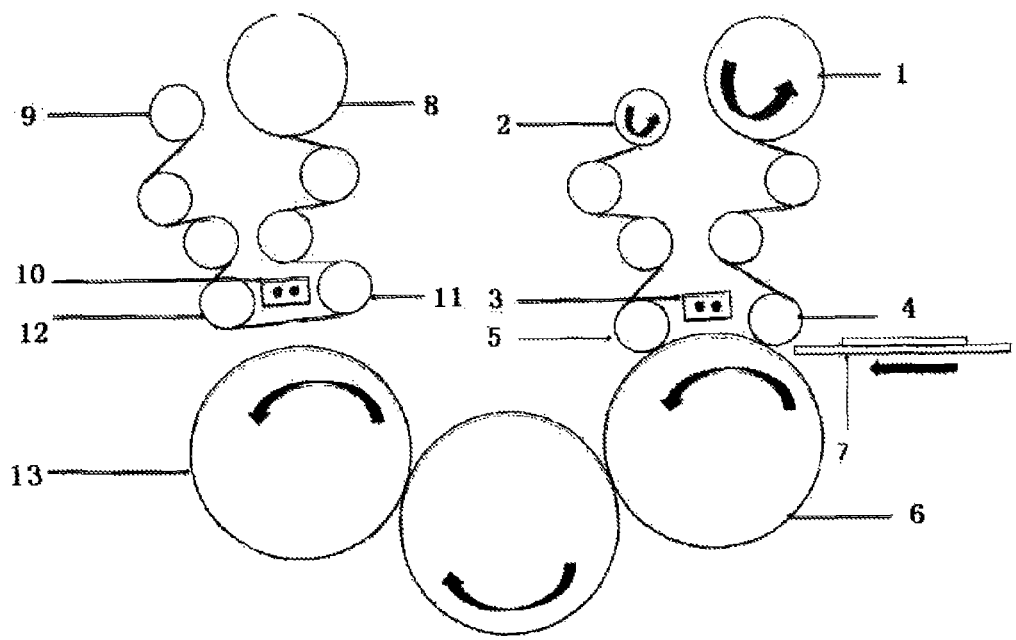
FIG. 5 is a structural schematic diagram of the present invention illustrating the first processing unit is thrown on for processing, the second processing unit is thrown off and stands by, and the first processing unit and the second processing unit use respective impression cylinders.

FIG. 5 shows a structural schematic diagram illustrating each of the two processing units uses one impression cylinder, wherein the second processing unit has an impression cylinder 13. When the installation space is relatively small, one impression cylinder is used, which needs to be a large-radius impression cylinder because two processing units are arranged thereon so as to cooperate with the two processing units to process the base material; and when the installation space is large enough, two small-radius impression cylinders can be used, and a processing unit is arranged on each impression cylinder, so that processing, of the base material is accomplished. Whichever of one large-radius impression cylinder or two small-radius impression cylinders can be used for single-piece and web-fed printing. However, the surface processing system with one large-radius impression cylinder is more suitable for web-fed printing, and the surface processing system with two small-radius impression cylinders is more suitable for single-piece printing.

Figure 9:
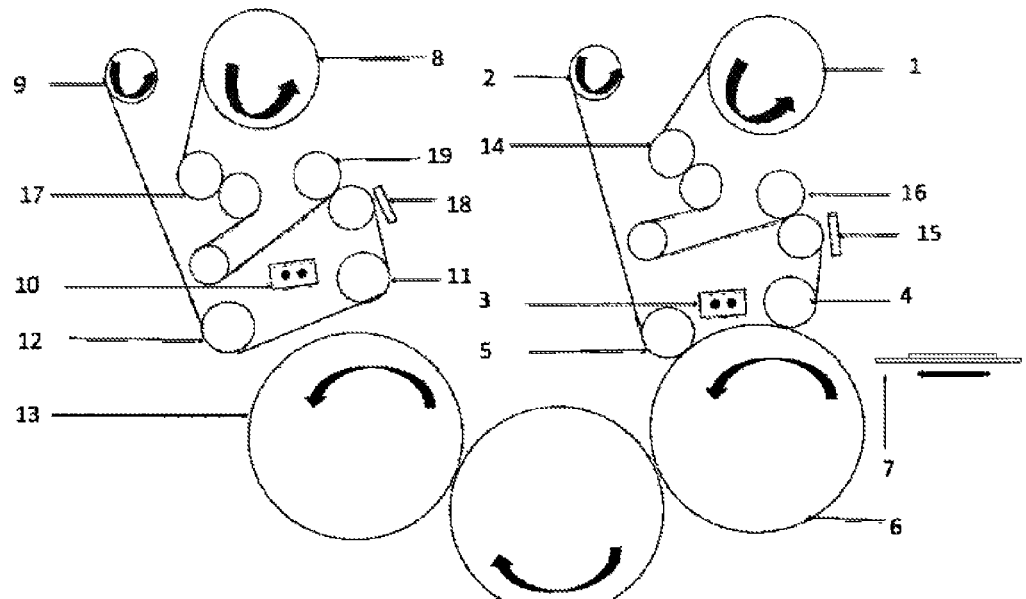
FIG. 9 is a structural schematic diagram of the present invention with a positioning stretching function, illustrating the first processing unit is thrown on for processing, the second processing unit is thrown off and stands by, and the first processing unit and the second processing unit use respective impression cylinders.

In the embodiment shown in FIG. 9, the film supply device in each processing unit is provided with a positioning stretching device between the pressure roller and the reeling device and a positioning stretching device between the pressure roller and the unreeling device to ensure the stable tension of films in the reeling and unreeling directions. Optionally, each of the first processing unit and the second processing unit described above is provided with at least one positioning stretching device for a film with a recognizable positioning mark or/and a different texture, and the at least one positioning stretching device forms a positioning processing system. As shown in FIG. 9, in the film supply device of the first processing unit, a positioning stretching device is arranged between the pressure roller and the unreeling device, and is composed of a first electric eye device 15, an A group of compaction rollers 14 and a B group of compaction rollers 16. The first electric eye device is a positioning or electric eye device capable of detecting the recognizable positioning mark and the edges of the film. The two compaction rollers in the A group of self-powered compaction rollers press against each other and rotate at the velocity smaller than or equal to the linear velocity of the impression cylinder, and the two compaction rollers in the B group of self-powered compaction rollers press against each other. Similarly, in the film supply device of the second processing unit, a positioning stretching device is arranged between the pressure roller and the unreeling device, and is composed of a first electric eye device 19, an A group of compaction rollers 18 and a B group of compaction rollers 20, and the positioning stretching device has the same structure as that in the first processing unit. The positioning stretching device at least can realize a plastic sheet and a relative positioning mark on the film arrive at the junction synchronously and achieve the beneficial effects of accurate positioning and film saving.

Each processing unit described above can be connected with one or more than one web-fed printing device, single-piece printing device or coating device for installation. The coating device generally refers to a common commercial coating or printing device available on the market, may include flexible printing, gravure printing, offset printing and ink-jet coating devices and the like, and can be used for glossing and printing. The gripping teeth on the impression cylinder of the processing unit connected with the single-piece printing device for installation may adopt the ones with vacuum negative pressure adsorption devices, thereby avoiding collision with the pressure roller and the film.

Figure 13:
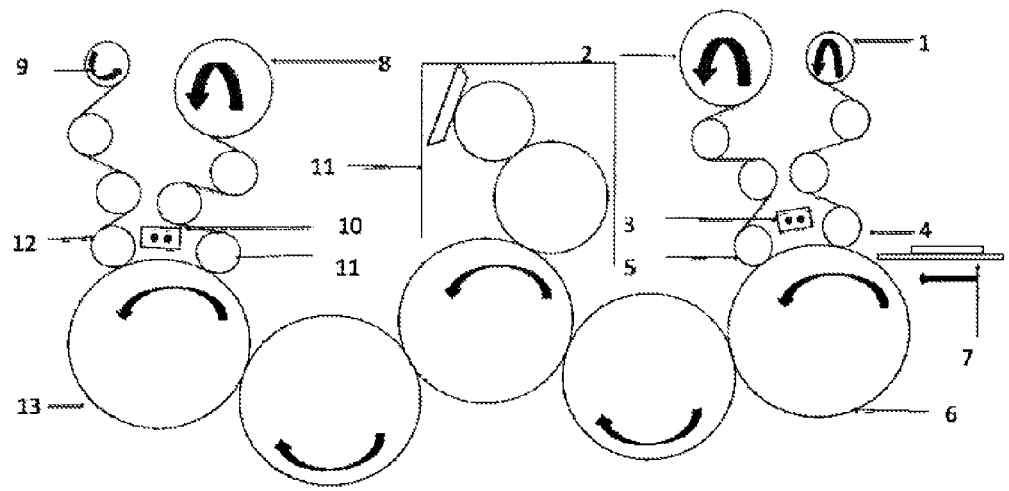
FIG. 13 is a structural schematic diagram of an embodiment of the present invention illustrating a coating unit is configured between the first processing unit and the second processing unit, and the first processing unit and the second processing unit use respective impression cylinders.
Figure 14:
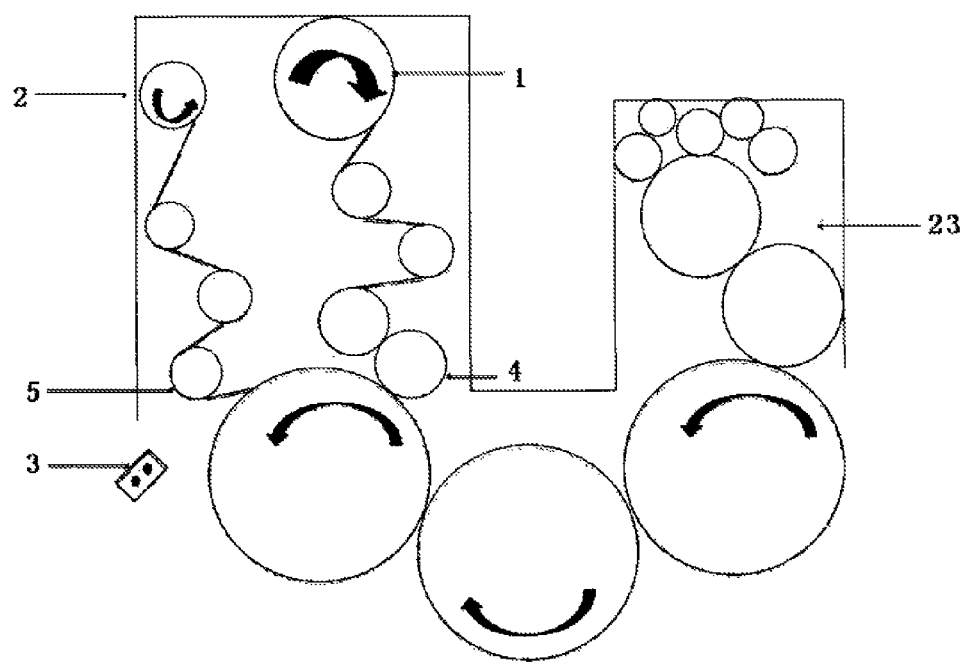
FIG. 14 is a structural schematic diagram of a processing system of the present invention for surface processing in the combination of the processing units and an offset printing machine.

FIG. 13 shows a structural schematic diagram of an embodiment of a processing system connected with a coating device 22. FIG. 14 shows a structural schematic diagram of an embodiment of a processing system for surface processing in the combination with the processing unit and an offset printing machine 23. When a paper base material passes through the offset printing unit 23, the offset-printed uncured paper base material completely comes into fit with the film material having a surface texture supplied by the unreeling device 1 of the processing unit at the rotating junction of the pressure roller and the impression cylinder. Then, the fitted film and paper base material are conveyed to a position below the curing device 3, the coating on the paper base material is cured by the curing device via the film, the cured coating at the moment is presented on the paper base material in a manner reverse to the surface texture of the film, and then the reeling device 2 in the processing unit strips the plastic film off the surface of the paper base material and rolls back. Finally, the cylinder conveys the paper after surface treatment to a paper reception unit or other processing unit.

The specific structure of each embodiment of the printing processing system of the present invention will be understood more clearly via the description of the printing processing technology below.

A multi-station non-stop printing processing technology, which is a casting printing technology, includes the following steps (1) A base material with an uncured coating is conveyed or dragged to the first processing unit, a film material with a surface texture supplied by the unreeling device of the first processing unit comes into fit with the base material completely at the rotating junction of the pressure roller and the impression cylinder, and the first processing unit is located at a position thrown on to the impression cylinder at the moment.
(2) After the plastic film with the surface texture and the base material with the uncured coating pass through the rotating junction of the pressure roller and the impression cylinder, complete fitting of the base station and the film is ensured, the fitted film and base material are conveyed to a position below the curing device, the coating on the base material is cured by the curing device via the plastic film, and the cured coating at the moment is presented on the base material in a manner reverse to the surface texture of the film; then the reeling device in the first processing unit strips the plastic film off the surface of the base material and rolls back, and finally, the base material is conveyed to a device (not shown in the figures) and the base material after surface treatment is conveyed to a reception unit.
(3) When the unreeling device in the first processing unit is to unreel to the proximity of the axis and the reeling device is to fully reel, the system accelerates the unreeling device and the reeling device in the second processing unit by operation of a computer or control of a sensor switch, and when the linear velocity of the film is same as that of the revolving speed of the impression cylinder, the pressure roller, the stripping roller and the curing device fixed on the secondary wallboard of the second processing unit simultaneously descend, so that the pressure roller comes into fit with the impression cylinder, that is, the second processing unit is thrown on to the impression cylinder; at the moment, the pressure roller, the stripping roller and the curing device fixed on the secondary wallboard of the first processing unit simultaneously ascend; when the secondary wallboard of the first processing unit moves till the straight line between the bottoms of the pressure roller and the stripping roller is higher than the highest point of the impression cylinder, the unreeling device of the first processing unit at the moment accomplishes reeling before unreeling of the unreeling device of the second processing unit is accomplished, and rests and waits for the unreeling device in the second processing unit; and when the second processing unit is to accomplish unreeling, the first processing unit starts unreeling again, so that the processing units cyclically work. The first processing unit and the second processing unit described above can share one impression cylinder to interactively perform the above procedures. If necessary, the first processing unit and the second processing unit described above can also use respective impression cylinders to interactively perform the above procedures.
(4) When the base material is too thick so that the pressure roller jumps when the <leading edge of the base material enters the junction, the pressure roller can be lifted to the height equivalent to the thickness of the base material under the operation of the computer or the control of the sensor switch before the base material enters the film supply device.
(5) The base material is conveyed to a device (e.g., a conveying belt, a drum, etc.) and the base material after surface treatment is conveyed to a reception unit, or the base material is farther connected to a web-fed printing device or a single-piece printing device or a glossing unit device or other processing unit. Thus, the reel change between the first processing unit and the second processing unit is repeated cyclically in sequence, automatic reel change is realized without stop, and the surface treatment of the paper is finally accomplished by the processing units in the processing system of the present invention.

A multi-station non-stop printing processing technology, which is a hot stamping processing technology, includes the following steps:

(1) a base material with uncured adhesive is conveyed or dragged to the first processing unit by a conveying device such as a conveying belt, gripping teeth and the like or a dragging device, the hot-stamped film supplied by the unreeling device of the first processing unit comes into fit with the base material completely at the rotating junction of the pressure roller and the impression cylinder, and the first processing unit is located at a position thrown on to the impression cylinder at the moment; and
(2) after the hot-stamped film and the base material with uncured adhesive pass through the rotating junction of the pressure roller and the impression cylinder, complete fitting of the base station and the hot-stamped film is ensured, the fitted film and base material are conveyed to a position below the curing device, the adhesive on the base material is cured by the curing device via the hot-stamped film, and the cured adhesive at the moment is combined with a sprayed aluminum layer on the surface of the film; then the reeling device in the first processing unit strips the hot-stamped film off the surface of the base material and rolls back, and the sprayed aluminum layer with metal feeling is presented at the original position of the adhesive on the base material at the same time; and finally, the base material is conveyed to a device and the base material after surface treatment is conveyed to a reception unit.

The film can be changed according to needs in the hot stamping process. If the secondary impression position can avoid the used or transferred position, the film can be further used. If the secondary impression position cannot avoid the used or transferred position, the film needs to be changed. Other procedures are the same as those in the casting printing technology.

The structure and the cooperative relation of the processing system of the present invention can be understood more clearly in combination with the application examples of the processing technology of the present invention below.

FIGS. 1 to 4 show an embodiment of application of the processing technology of the present invention:

A piece of paper, after subjected to web-fed printing and glossing, enters the processing system simultaneously with a film having a surface texture, the second processing unit at the moment is still and is located at a position thrown off the impression cylinder for standby, the paper 7 with an uncured coating is dragged to completely fit the film material having the surface texture supplied by the unreeling device 1 in the first processing unit at the rotating junction of the pressure roller 4 and the impression cylinder 6. Then, the fitted film and paper 7 are conveyed to a position below the curing device 3, the coating on the paper 7 is cured by the curing device via the film, the cured coating at the moment is presented on the paper in a manner reverse to the surface texture of the film, and then the reeling device 2 in the first processing unit strips the film off the surface of the paper 7 and rolls back, as seen in FIG. 1. Finally, the cylinder conveys the paper after surface treatment to a paper reception unit or other processing unit.

Figure 2:
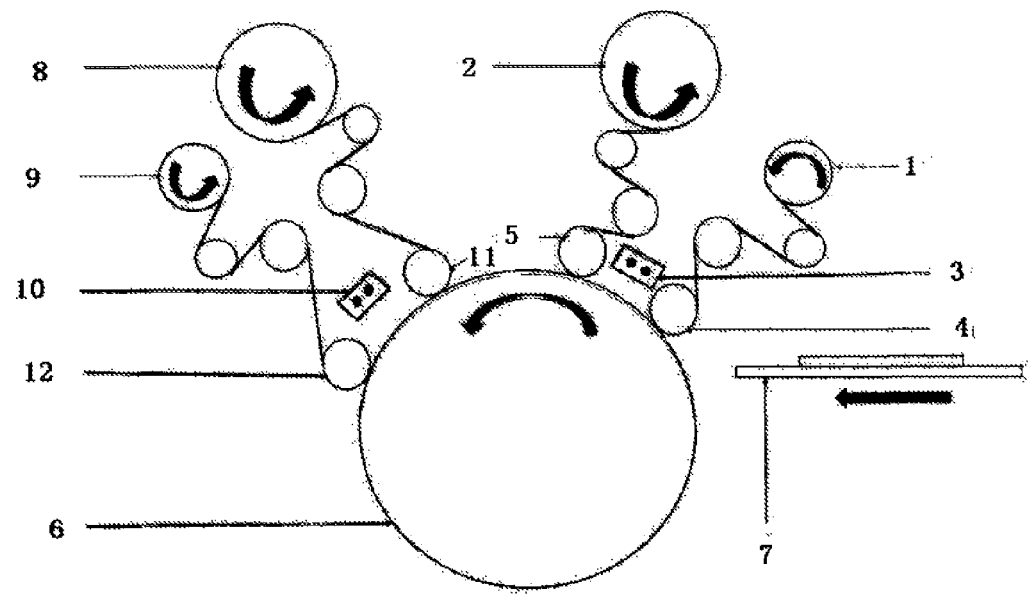
FIG. 2 is a structural schematic diagram of the present invention illustrating the first processing unit is thrown on and its unreeling is nearly completed, the second processing unit is thrown on at the same speed, and the first processing unit and the second processing unit share one impression cylinder.
Figure 3:
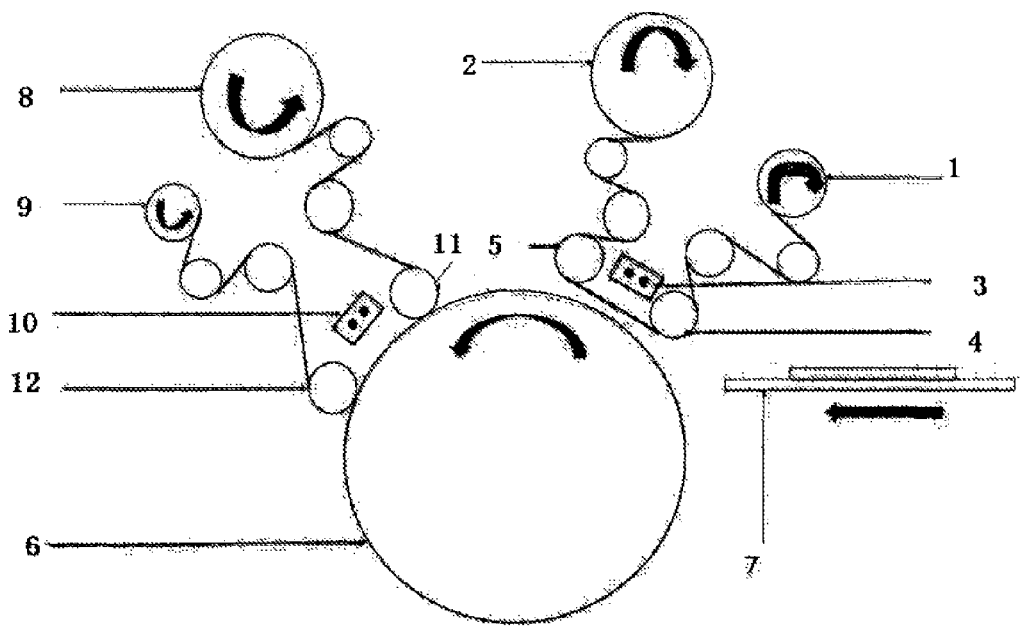
FIG. 3 is a structural schematic diagram of the present invention illustrating the second processing unit is thrown on for processing, the first processing unit is thrown off and re-reels at a high speed, and the first processing unit and the second processing unit share one impression cylinder.

When the unreeling device 1 in the first processing unit is to unreel to the proximity of the axis and the reeling device 2 is to fully reel, the processing system accelerates the unreeling device 8 and the reeling device 9 in the second processing unit by operation of a computer or control of a sensor switch, and when the linear velocity of the film is same as that of the revolving speed of the impression cylinder 6, the pressure roller 11, the stripping roller 12 and the curing device 10 installed on the secondary wallboard simultaneously descend, so that the pressure roller 11 comes into fit with the impression cylinder 6, that is, the second processing unit is thrown on to the impression cylinder, as seen in FIG. 2. Then, the pressure roller 4, the stripping roller 5 and the curing device 3 fixed on the secondary wallboard 28 in the first processing unit ascend; when the secondary wallboard moves till the straight line between the bottoms of the pressure roller 4 and the stripping roller 5 is higher than the highest point of the impression cylinder 6, the reeling device 2 is independently driven to unreel at a speed higher than that of the impression cylinder 6, and the unreeling device 1 re-reels at a high speed. Simultaneously, the paper 7 with the uncured coating is continuously conveyed or dragged to completely fit the film supplied by the unreeling device in the second processing unit at the rotating junction of the pressure roller 11 and the impression cylinder 6. After the paper is completely fitted with the film, the fitted film and paper are conveyed to a position below the curing device 10, the coating on the paper is cured by the curing device via the film, the cured coating at the moment is presented on the paper in a manner reverse to the surface texture of the film, and then the reeling device 9 in the second processing unit strips the film off the surface of the paper and rolls back, as seen in FIG. 3. Finally, the cylinder conveys the paper after surface treatment to the paper reception unit or other processing unit.

Figure 4:
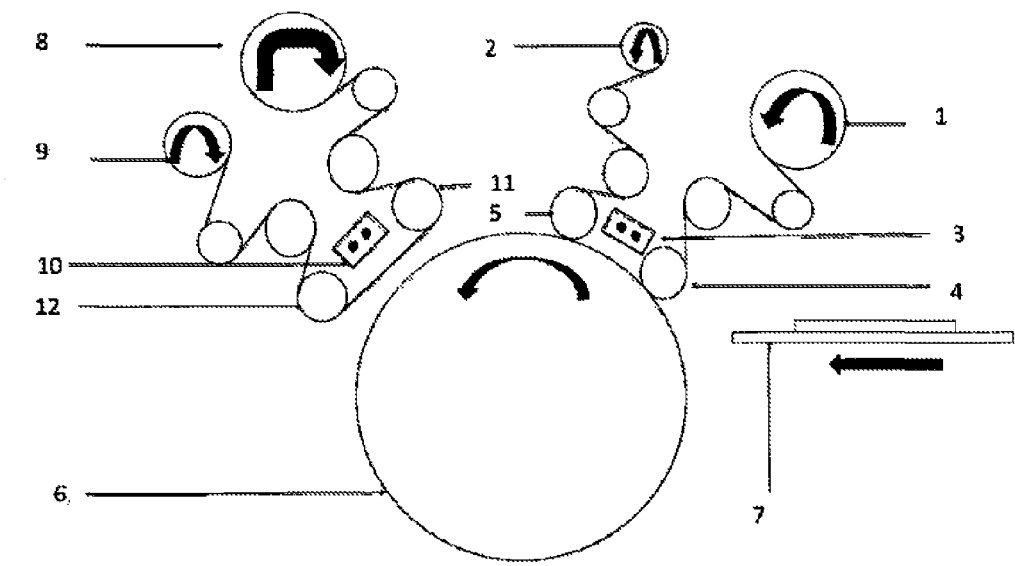
FIG. 4 is a structural schematic diagram of the present invention illustrating the first processing unit is thrown on for processing, the second processing unit is thrown off and re-reels at a high speed, and the first processing unit and the second processing unit share one impression cylinder.

When the unreeling device 8 in the second processing unit is to unreel to the proximity of the axis and the reeling device 9 is to fully reel, the pressure roller 4 of the first processing unit is thrown on to the impression cylinder 6 by adopting the above method, meanwhile, the pressure roller 11 of the second processing device is thrown off the impression cylinder 6, and the unreeling device 8 in the second processing unit starts high-speed re-reeling, as seen in FIG. 4, to prepare for next unreeling when unreeling of the unreeling device 1 of the first processing unit is to be completed. Thus, the reel change between the first processing unit and the second processing unit is repeated cyclically in sequence, automatic reel change is realized without stop, and the surface treatment of the paper is finally accomplished by the processing units in the system.

The judgment criterion that the unreeling device in the first processing unit is to unreel to the proximity of the axis and the reeling device is to fully reel described above is that the linear velocity of the film in the unreeling and reeling devices of the second processing unit is just the same as that of the impression cylinder 6 when the unreeling device of the first processing unit ends unreeling and the reeling device fully re-reels, so that gapless interchange between their throwing on and throwing off can be realized, and vice versa.

FIGS. 5 to 8 show another embodiment of application at the processing technology of the present invention;

A paper base material 7 with uncured adhesive and a cold-stamped film simultaneously enter the processing system, and the first processing unit and the second processing unit of the processing system are respectively provided with an impression cylinder 6 and an impression cylinder 13. The second processing unit at the moment is still and is located at a position thrown off the impression cylinder for standby, the paper base material 7 with uncured adhesive is dragged to completely fit the cold-stamped film supplied by the unreeling device in the first processing unit at the rotating junction of the pressure roller 4 and the impression cylinder 6. Then, the fitted cold-stamped film and paper base material 7 are conveyed to a position below the curing device 3, the adhesive on the paper base material 7 is cured by the curing device via the cold-stamped film, the cured and viscosified adhesive at the moment is firmly combined with a sprayed aluminum layer at the corresponding position below the surface of the film, then the reeling device 2 in the first processing unit strips the sprayed aluminum layer on the film off the film, and the sprayed aluminum layer is attached to the surface of the paper base material 7, as seen in FIG. 5. Finally, the cylinder conveys the paper base material 7 with the aluminum layer to the paper reception unit or other processing unit.

Figure 6:
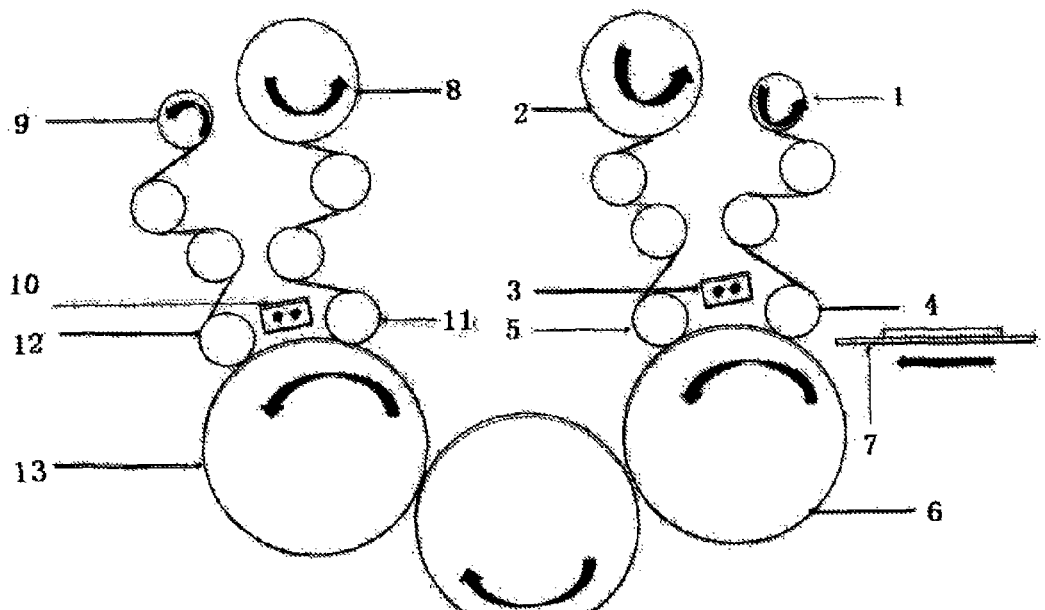
FIG. 6 is a structural schematic diagram of the present invention illustrating the first processing unit is thrown on and its unreeling is nearly completed, the second processing unit is thrown on at the same speed, and the first processing unit and the second processing unit use respective impression cylinders.
Figure 7:
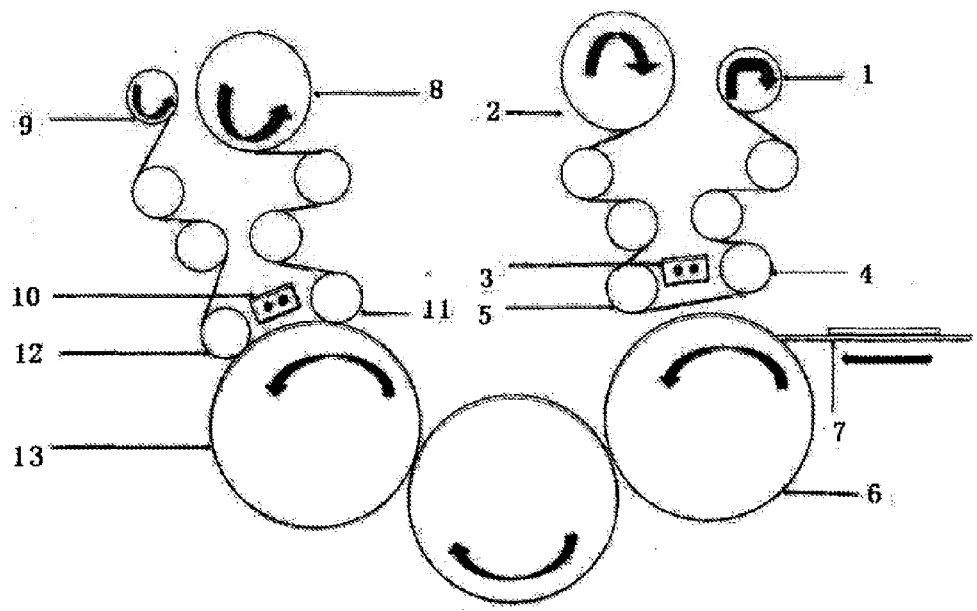
FIG. 7 is a structural schematic diagram of the present invention illustrating the second processing unit is thrown on for processing, the first processing unit is thrown off and re-reels at a high speed, and the first processing unit and the second processing unit use respective impression cylinders.

When the unreeling device 1 in the first processing unit is to unreel to the proximity of the axis and the reeling device 2 is to fully reel, the processing system accelerates the unreeling device 8 and the reeling device 9 in the second processing unit by operation of a computer or control of a sensor switch, and when the linear velocity of the cold-stamped film is same as that of the revolving speed of the impression cylinder 13, the pressure roller 11, the stripping roller 12 and the curing device 10 fixed on the secondary wallboard simultaneously descend, so that the pressure roller 11 comes into fit with the impression cylinder 13, as seen in FIG. 6. Then, the pressure roller 4, the stripping roller 5 and the curing device 3 fixed on the secondary wallboard in the first processing unit ascend; when the secondary wallboard moves till the straight line between the bottoms of the pressure roller 4 and the stripping roller 5 is higher than the highest point of the impression cylinder 6, the reeling device 2 is independently driven to unreel at a speed higher than that of the impression cylinder 6, and the unreeling device 1 re-reels at a high speed. Simultaneously, the paper base material 7 with uncured adhesive is continuously conveyed or dragged to completely fit the cold-stamped film supplied by the unreeling device 8 in the second processing unit at the rotating junction of the pressure roller 11 and the impression cylinder 13. After the paper base material 7 is completely fitted with the cold-stamped film, the fitted cold-stamped film and paper base material 7 are conveyed to a position below the curing device 10, the adhesive on the paper base material 7 is cured by the curing device via the cold-stamped film, the cured and viscosified adhesive at the moment is firmly combined with the sprayed aluminum layer at the corresponding position below the surface of the film, then the reeling device 9 in the second processing unit strips the sprayed aluminum layer on the film off the film, and the sprayed aluminum layer is attached to the surface of the paper base material, as seen in FIG. 7. Finally, the cylinder conveys the paper base material with the aluminum layer after surface treatment to the paper reception unit or other processing unit.

Figure 8:
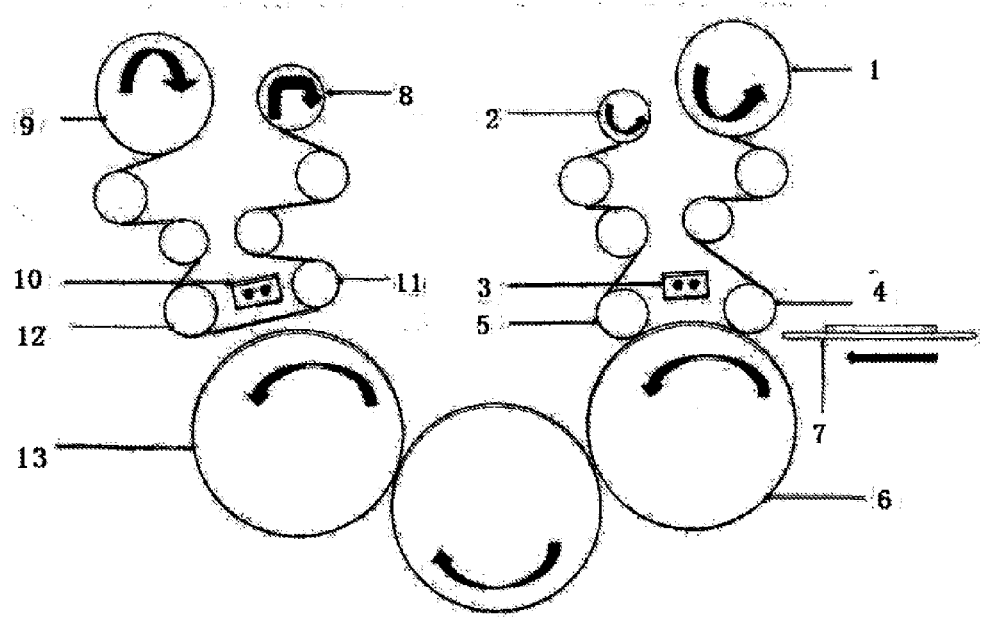
FIG. 8 is a structural schematic diagram of the present invention illustrating the first processing unit is thrown on for processing, the second processing unit is thrown off and re-reels at a high speed, and the first processing unit and the second processing unit use respective impression cylinders.

When the unreeling device 8 in the second processing unit is to unreel to the proximity of the axis and the reeling device 9 is to fully reel, the pressure roller 4 of the first processing unit is thrown on to the impression cylinder 6 by adopting the above method, meanwhile, the pressure roller 11 of the second processing device is thrown off the impression cylinder 13, and the unreeling device 8 in the second processing unit starts high-speed re-reeling, as seen in FIG. 8, to prepare for next unreeling when unreeling of the unreeling device 1 of the first processing unit is to be completed. Thus, the reel change between the first processing unit and the second processing unit is repeated cyclically in sequence, automatic reel change is realized without stop, and the surface treatment of the paper base material is finally accomplished by the processing units in the system.

FIGS. 9 to 12 show a further embodiment of application of the processing technology of the present invention:

Referring to FIG. 9, after a plastic sheet is glossed by a glossing unit and before the plastic sheet and a film simultaneously enter the first processing unit of the processing system, the first group of electric eye device 15 detects the recognizable mark on the film supplied by the unreeling device 1, and the time from the mark to the junction of the film and the plastic sheet 7 is calculated with a running speed. Based on the predetermined difference of time when the positioning mark on the film and the relative positioning point of the plastic sheet 7 arrive at the junction, the tension of the film itself is changed by adjusting/reducing the speed of the A group of servo controlled active compaction rollers 14 in the positioning stretching device for the film, and the length of the film is changed thereby. However, the speed of the B group of compaction rollers 16 in the positioning stretching device is the same as the running speed of a host to ensure the synchrony when the corresponding points of the film and the plastic sheet 7 enter the junction. The servo control indicates control on the rotating speed via the input of an analog quantity or the frequency of pulse.

The second processing unit at the moment is still and is located at a position thrown off the impression cylinder 13 for standby, the plastic sheet 7 with an uncured coating is dragged to completely fit the positioned and stretched film supplied by the unreeling device 1 in the first processing unit at the rotating junction of the pressure roller 4 and the impression cylinder 6. Then, the fitted film and plastic sheet 7 are conveyed to a position below the curing device 3, the coating on the plastic sheet is cured by the curing device via the film, the cured coating at the moment is presented on the plastic sheet 7 in a manner reverse to the surface texture of the film, and then the reeling device 2 in the first processing unit strips the film off the surface of the plastic sheet 7 and rolls back. Finally, the cylinder conveys the plastic sheet 7 after surface treatment to the reception unit or other processing unit.

Figure 10:
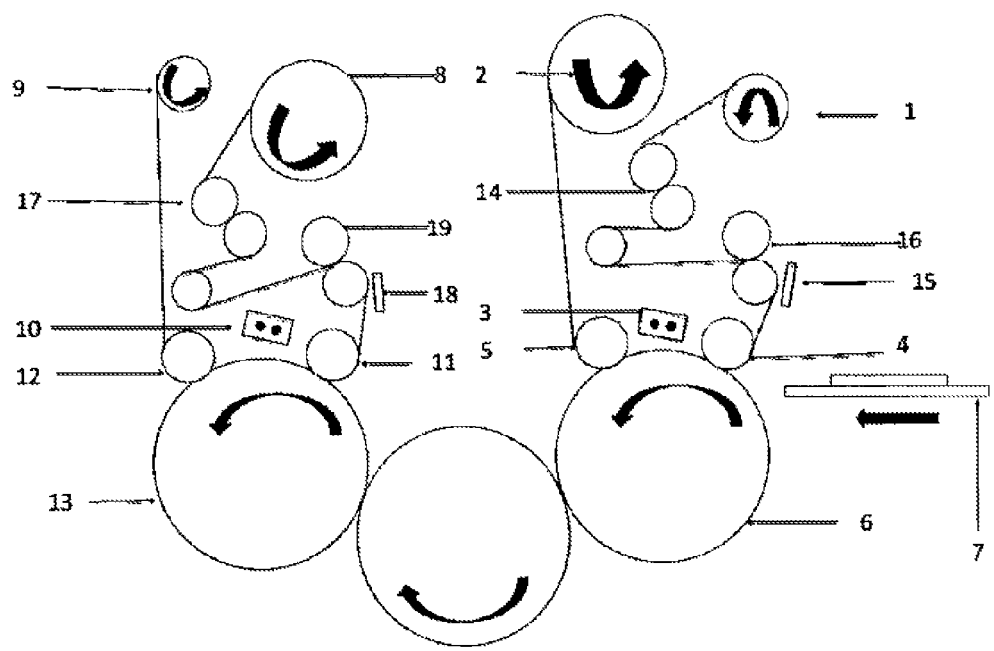
FIG. 10 is a structural schematic diagram of the present invention with a positioning stretching function, illustrating the first processing unit is thrown on and its unreeling is nearly completed, the second processing unit is thrown on at the same speed, and the first processing unit and the second processing unit use respective impression cylinders.
Figure 11:
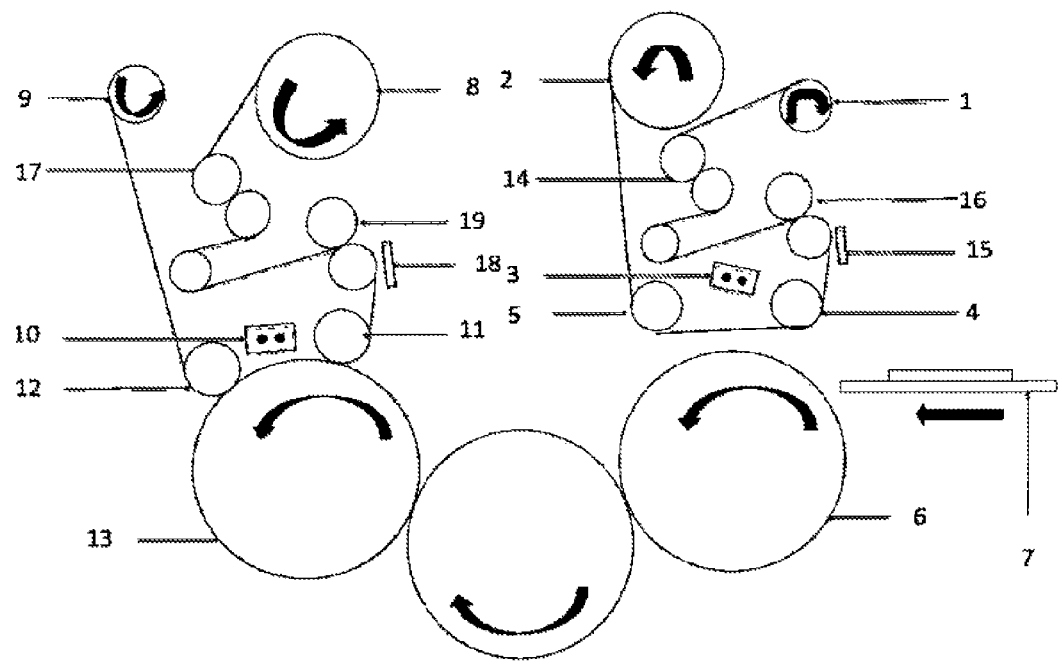
FIG. 11 is a structural schematic diagram of the present invention with a positioning stretching function, illustrating the second processing unit is thrown on for processing, the first processing unit is thrown off and re-reels at a high speed, and the first processing unit and the second processing unit use respective impression cylinders.

When the unreeling device 1 in the first processing unit is to unreel to the proximity of the axis and the reeling device 2 is to fully reel, the processing system accelerates the unreeling device 8 and the reeling device 9 in the second processing unit by operation of a computer or control of a sensor switch, and when the linear velocity of the film is the same as that of the revolving speed of the impression cylinder 13, the pressure roller 11, the stripping roller 12 and the curing device 10 fixed on the secondary wallboard simultaneously descend, so that the pressure roller 11 comes into fit with the impression cylinder 13, as seen in FIG. 10. In this process, the first electric eye device 19 in the second processing unit detects the recognizable mark on the film supplied by the unreeling device 8, and the time from the mark to the junction of the film and the plastic sheet 7 is calculated with a running speed. Based on the predetermined difference of time when the positioning mark on the film and the relative positioning point of the plastic sheet 7 arrive at the junction, the tension of the film itself is changed by adjusting/reducing the speed of the A group of servo controlled active compaction rollers 18 in the positioning stretching device for the film, and the length of the film is changed thereby to realize positioning stretching of the film. Then, the pressure roller 4, the stripping roller 5 and the curing device 3 fixed on the secondary wallboard in the first processing unit ascend; when the secondary wallboard moves till the straight line between the bottoms of the pressure roller 4 and the stripping roller 5 is higher than the highest point of the impression cylinder 6, the reeling device 2 is independently driven to unreel at a speed higher than that of the impression cylinder 6, and the unreeling device 1 re-reels at a high speed. Simultaneously, the plastic sheet 7 with the uncured coating is continuously conveyed or dragged to completely fit the positioned and stretched film supplied by the unreeling device 8 in the second processing unit at the rotating junction of the pressure roller 11 and the impression cylinder 13. After the plastic sheet 7 is completely fitted with the film, the fitted film and plastic sheet 7 are conveyed to a position below the curing device, the coating on the plastic sheet 7 is cured by the curing device via the film, the cured coating at the moment is presented on the plastic sheet 7 in a manner reverse to the surface texture of the film, and then the reeling device 9 in the second processing unit strips the film off the surface of the plastic sheet 7 and rolls back. Finally, the cylinder conveys the plastic sheet 7 after surface treatment to the reception unit or other processing unit, as seen in FIG. 1.

Figure 12:
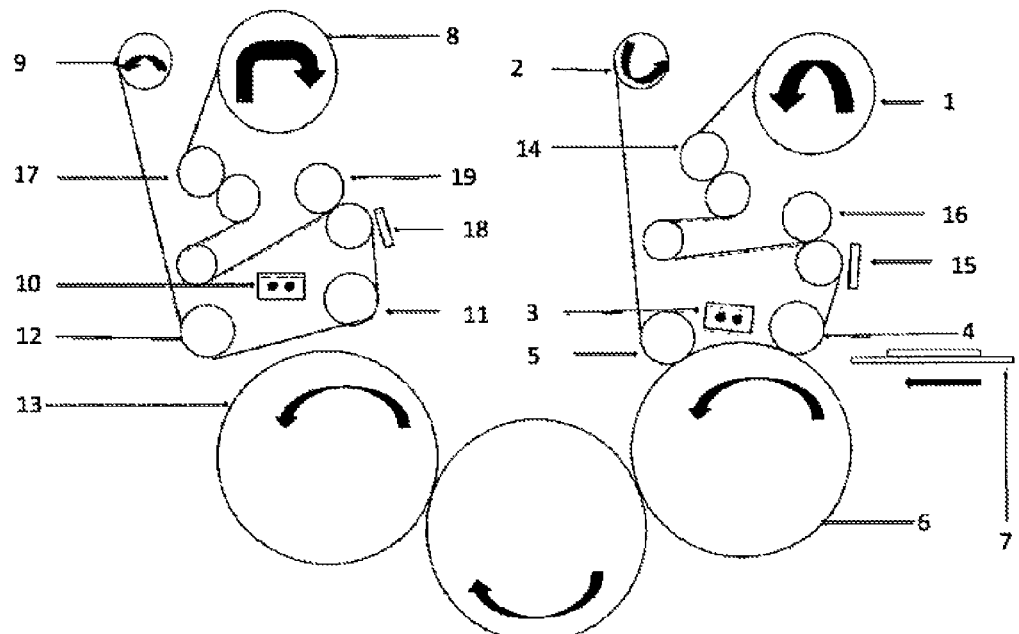
FIG. 12 is a structural schematic diagram of the present invention with a positioning stretching function, illustrating the first processing unit is thrown on for processing, the second processing unit is thrown off and re-reels at a high speed, and the first processing unit and the second processing unit use respective impression cylinders.

When the unreeling device 8 in the second processing unit is to unreel to the proximity of the axis and the reeling device 9 is to fully reel, the pressure roller 4 of the first processing unit is thrown on to the impression cylinder 6 by adopting the above method, meanwhile, the pressure roller 11 of the second processing device is thrown off the impression cylinder 13, and the unreeling device 8 in the second processing unit starts high-speed re-reeling, as seen in FIG. 12, to prepare for next unreeling when unreeling of the unreeling device 1 of the first processing unit is to be to completed. Thus, the reel change between the first processing unit and the second processing unit is repeated cyclically in sequence, automatic reel change is realized without stop, and the surface treatment with positioning stretching on the plastic sheet is finally accomplished by the processing units in the system.

FIG. 13 shows a further embodiment of application of the processing technology of the present invention:

In addition to the glossing unit (not shown) preceding the first processing unit, a coating unit 22 is further arranged between the first processing unit and the second processing unit.

A glossed and uncured paper base material 7 completely comes into fit with a film material having a surface texture supplied by the unreeling device 1 in the first processing unit at the rotating junction of the pressure roller and the impression cylinder. Then, the fitted film and paper base material 7 are conveyed to a position below the curing device 3, the coating on the paper base material 7 is cured by the curing device via the film, the cured coating at the moment is presented on the paper base material 7 in a manner reverse to the surface texture of the film, and then the reeling device 2 in the first processing unit strips the film off the surface of the paper base material 7 and rolls back. The paper base material 7 with film surface texture I is coated by the coating unit 22, and the paper base material 7 with film surface texture I glossed for the second time completely comes into fit with a film material having surface texture II supplied by the unreeling device 8 in the second processing unit at the rotating junction of the pressure roller 11 and the impression cylinder 13. Then, the fitted film and paper base material are conveyed to a position below the curing device 10 the coating on the paper base material 7 is cured by the curing device via the film, the cured coating at the moment is presented on the paper base material with a film surface texture in a manner reverse to the surface texture II of the film, then the reeling device 2 in the first processing unit strips the film off the surface of the paper base material 7 and rolls back, and finally, patterns with a combined surface texture I and surface texture II are presented on the paper base material by using the two different coating units in combination with mutual registration of the films with two different surface textures.

Although the embodiments and the drawings of the present invention are disclosed for illustrative purposes, those skilled in the art could understand that various substitutions, changes and modifications are possible without departing from the spirit and scope of the present invention and the appended claims, so the scope of the present invention is not limited to the contents disclosed by the embodiments and the drawings.

The invention claimed is:

1. A printing processing system for processing a base material, comprising:
    a first processing unit, including a first film supply device, a first pressure roller, a first stripping roller and a first curing device which are independent, the first film supply device including a first reeling device and a first unreeling device which are independently driven and can rotate forwardly and reversely, the first pressure roller, the first stripping roller and the first curing device being installed in a lifting manner, the first film supply device being provided with a first positioning stretching device, the first film supply device being configured to supply a first film with a first texture;
    a second processing unit including a second film supply device, a second pressure roller, a second stripping roller and a second curing device which are independent, the second film supply device including a second reeling device and a second unreeling device which are independently driven and can rotate forwardly and reversely, the second pressure roller, the second stripping roller and the second curing device being installed in a lifting manner, the second film supply device being provided with a second positioning stretching device, the second film supply device being configured to supply a second film with a second texture;
    a first impression cylinder, positioned under the first processing unit and configured to convey the base material;
    a second impression cylinder, positioned under the second processing unit and configured to convey the base material;
    a coating unit, positioned between the first processing unit and the second processing unit and configured to coat the base material;
    a third cylinder, positioned under the coating unit and between the first impression cylinder and the second impression cylinder and configured to convey the base material;
    wherein the first processing unit is configured to cooperate with the first impression cylinder to apply the first texture on the base material, and the second processing unit is configured to cooperate with the second impression cylinder to apply the second texture, which is different from the first texture, on the base material;
    wherein the first processing unit and the second processing unit are configured to process the base material or respective base materials at the same time;
    wherein the first positioning stretching device includes:
        a first group of self-powered compaction rollers, two compaction rollers in the first group press against each other and rotate at a velocity smaller than or equal to a linear velocity of the first impression cylinder, and
        a second group of self-powered compaction rollers, two compaction rollers in the second group press against each other;
    wherein the second positioning stretching device includes:
        a third group of self-powered compaction rollers, two compaction rollers in the third group press against each other and rotate at a velocity smaller than or equal to a linear velocity of the second impression cylinder, and
        a fourth group of self-powered compaction rollers, two compaction rollers in the fourth group press against each other.

2. The printing processing system according to claim 1, wherein the first processing unit further includes:
    a first main wallboard, and
    a first secondary wallboard, which can move on the first main wallboard,
        wherein the first pressure roller, the first stripping roller, and the first curing device are all mounted on the first secondary wallboard;
    wherein the second processing unit further includes:
        a second main wallboard, and
        a second secondary wallboard, which can move on the second main wallboard,
        wherein the second pressure roller, the second stripping roller, and the second curing device are all mounted on the second secondary wallboard.

3. The printing procession system according to claim 2, wherein a first slide rail is provided between the first main wallboard and the first secondary wallboard, the first secondary wallboard can move up and down through the first slide rail by a first lift control device, so that the first film and the first impression cylinder can run in different directions without rubbing when the first secondary wallboard moves up to separate the first film from the first impression cylinder; and wherein a second slide rail is provided between the second main wallboard and the second secondary wallboard, the second secondary wallboard can move up and down through the second slide rail by a second lift control device, so that the second film and the second impression cylinder can run in different directions without rubbing when the second secondary wallboard moves up to separate the second film from the second impression cylinder.

4. The printing processing system according to claim 2, wherein the first curing device is fixedly mounted on the first secondary wallboard, and the second curing device is fixedly mounted on the second secondary wallboard;

wherein the first processing unit further comprises a first pressure roller lifting control device and a first stripping roller lifting control device, wherein through the first pressure roller lifting control device and the first stripping roller lifting control device, the first pressure roller and the tint stripping roller can be respectively mounted on the first secondary wallboard in a lifting manner;

wherein the second processing unit thither comprises a second pressure roller lifting control device and a second stripping roller lifting control device, wherein through the second pressure roller lifting control device and the second stripping roller lifting control device, the second pressure roller and the second stripping roller can be respectively, mounted on the second secondary wallboard in a lifting manner;

wherein the first pressure roller lifting control device is selected from the group consisting of an air cylinder, a mechanical cam and an electronic cam, the first stripping roller lifting control device is selected from the group consisting of an air cylinder, a mechanical cam and an electronic cam, the second lifting control device is selected from the group consisting of an air cylinder, a mechanical cam and an electronic cam, and the second stripping roller lifting control device is selected from the group consisting of an air cylinder, a mechanical cam and an electronic cam.

5. The printing processing system according to claim 1, wherein the first positioning stretching device ensures a stable tension of the first in a reeling and an unreeling direction, and the second positioning stretching device ensures a stable tension of the second film in a reeling and an unreeling direction.

6. The printing processing system according to claim 5, wherein the first positioning stretching device further comprises a first electric eye device, which can detect a recognizable mark of the first film, and wherein the first positioning stretching device forms a first positioning processing system.

7. The printing processing system according to claim 5, wherein the second positioning stretching device further comprises a second electric eye device, which can detect a recognizable mark of the second film, and, wherein the second positioning stretching device forms a second positioning processing system.

8. The printing processing system according to claim 1, wherein each of the first processing unit and the second processing unit is installed through connection with one or more web-fed printing devices, a single-piece printing devices or a coating unit device.

9. The system according to claim 1, wherein the first film and the second film have different conveying lines, respectively.

10. A method of operating a printing processing system to process at base material,
wherein the printing processing system includes:
a first processing unit, including a first film supply device, a first pressure roller, a first stripping roller and a first curing device which are independent, the first film supply device including a first reeling device and a first unreeling device which are independently driven and can rotate forwardly and reversely, the first pressure roller, the first stripping roller and the first curing device being installed in a lifting manner, the first film supply device being provided with a first positioning stretching device, the first film supply device being configured to supply a first film with a first texture;

a second processing unit including a second film supply device, a second pressure roller, a second stripping roller and a second curing device which are independent, the second film supply device including a second reeling device and a second unreeling device which are independently driven and can rotate forwardly and reversely, the second pressure roller, the second stripping roller and the second curing device being installed in a lifting manner, the second film supply device being provided with a second positioning stretching device, the second film supply device being configured to supply a second film with a second texture;

a first impression cylinder, positioned under the first processing unit and configured to convey the base material, a second impression cylinder, positioned under the second processing unit and configured to convey the base material;

a coating unit, positioned between the first processing unit and the second processing unit and configured to coat the base material;

a third cylinder, positioned under the coating unit and between the first impression cylinder and the second impression cylinder and configured to convey the base material;

wherein the first processing unit is configured to cooperate with the first impression cylinder to apply the first texture on the base material, and the second processing unit is configured to cooperate with the second impression cylinder to apply the second texture, which is different from the first texture, on the base material;

wherein the first processing unit and the second processing unit are configured to process the base material or respective base materials at the same time;

wherein the first positioning stretching device includes:
a first group of self-powered compaction rollers, two compaction rollers in the first group press against each other and rotate at a velocity smaller than or equal to a linear velocity of the first impression cylinder, and
a second group of self-powered compaction rollers, two compaction rollers in the second group press against each other;

wherein the second positioning stretching device includes:
a third group of self-powered compaction rollers, two compaction rollers in the third group press against each other and rotate at a velocity smaller than or equal to a linear velocity of the second impression cylinder, and
a fourth group of self-powered compaction rollers, two compaction rollers in the fourth group press against each other;

wherein the method comprising the following steps:
throwing the first processing unit onto the first impression cylinder to transfer the first texture of the first film onto the base material, wherein the first unreeling device unreels the first film and the first reeling device reels the first film;
coating the base material with the coating unit; and
throwing the second processing unit onto the second impression cylinder to transfer the second texture of the second film onto the base material, wherein the second unreeling device unreels the second film and the second reeling device reels the second film;

wherein when the second processing unit is thrown onto the base material, the first processing unit is kept thrown on.

11. A method of operating a printing processing system to process a base material,
wherein the printing processing system includes:
a first processing unit, including a first film supply device, a first pressure roller, a first stripping roller and a first curing device which are independent, the first film supply device including a first reeling device and a first unreeling device which are independently driven and can rotate forwardly and reversely, the first pressure roller, the first stripping roller and the first curing device being installed in a lifting manner, the first film supply device being provided with a first positioning stretching device, the first film supply device being configured to supply a first film with a first texture;
a second processing unit including a second film supply device, a second pressure roller, a second stripping roller and a second curing device which are independent, the second film supply device including a second reeling device and a second unreeling device which are independently driven and can rotate forwardly and reversely, the second pressure roller, the second stripping roller and the second curing device being installed in a lifting manner, the second film supply device being provided with a second positioning stretching device, the second film supply device being configured to supply a second film with a second texture;
a first impression cylinder, positioned under the first processing unit and configured to convey the base material;
a second impression cylinder, positioned under the second processing unit and configured to convey the base material;
a coating unit, positioned between the first processing unit and the second processing unit and configured to coat the base material;
third cylinder, positioned under the coating unit and between the first impression cylinder and the second impression cylinder and configure to convey the base material;
wherein the first processing unit is configured to cooperate with the first impression cylinder to apply the first texture on the base material, and the second processing unit is configured to cooperate with the second impression cylinder to apply the second texture, which is different from the first texture, on the base material;
wherein the first processing unit and the second processing unit are configured to process the base material or respective base materials at the same time;
wherein the first positioning stretching device includes;
a first group of self-powered compaction rollers, two compaction rollers in the first group press against each other and rotate at a velocity smaller than or equal to a linear velocity of the first impression cylinder, and
a second group of self-powered compaction rollers, two compaction rollers in the second group press against each other;
wherein the second positioning stretching device includes:
a third group of self-powered compaction rollers, two compaction rollers in the third group press against each other and rotate at a velocity smaller than or equal to a linear velocity of the second impression cylinder, and
a fourth group of self-powered compaction rollers, two compaction rollers in the fourth group press against each other;
wherein the first processing unit further includes:
a first main wallboard, and
a first secondary wallboard, which can move on the first main wallboard,
wherein the first pressure roller, the first stripping roller, and the first curing device are all mounted on the first secondary wallboard;
wherein the second processing unit farther includes:
a second main wallboard, and
a second secondary wallboard, which can move on the second main wallboard,
wherein the second pressure roller, the second stripping roller, and the second curing device are all mounted on the second secondary wallboard:
wherein the method comprises the following steps:
conveying the base material to the first impression cylinder;
throwing the first processing unit onto the first impression cylinder, wherein the first film is in contact with the base material at a rotating junction of the first pressure roller and the first impression cylinder, and the first stripping roller strips the first film off a surface of the base material;
conveying the base material to the third cylinder;
coating the base material with the coating unit;
conveying the base material to the second impression cylinder;
throwing the second processing unit onto the second impression cylinder, wherein the second film is in contact with the base material at a rotating junction of the second pressure roller and the second impression cylinder, and the second stripping roller strips the second film off the surface of the base material,
wherein when the second processing unit is thrown onto the base material, the first processing unit is kept thrown on.

12. A printing processing process for processing a base material, comprising:
providing a first processing unit, wherein the first processing unit includes a first film supply device, a first pressure roller, a first stripping roller and a first curing device which are independent, the first film supply device includes a first reeling device and a first unreeling device which are independently driven and can rotate forwardly and reversely the first film supply device being configured to supply a first film with a first texture;
providing a second processing unit, wherein the second processing unit includes a second film supply device, a second pressure roller, a second stripping roller and a second curing device which are independent, the second film supply device includes a second reeling device and a second unreeling device which are independently driven and can rotate forwardly and reversely, the second film supply device being configured to supply a second film with a second texture;
installing the first pressure roller, the first stripping roller and the first curing device in a lifting manner;

installing the second pressure roller, the second stripping roller and the second curing device in a lifting manner;

providing a first impression cylinder positioned under the first processing unit and configured to convey the base material;

providing a second impression cylinder positioned under the second processing unit and configured to convey the base material;

providing a coating unit positioned between the first processing unit and the second processing unit and configured to coat the base material, providing a third cylinder positioned under the coating unit and between the first impression cylinder and the second impression cylinder and configured to convey the base material;

wherein the first processing unit is configured to cooperate with the first impression cylinder to apply the first texture on the base material, and the second processing unit is configured to cooperate with the second impression cylinder to apply the second texture, which is different from the first texture, on the base material, and wherein the first processing unit and the second processing unit are configured to process the base material or respective base materials at the same time.

13. The printing processing process according to claim 12, wherein the printing processing process further comprises the following steps:

installing the first pressure roller, the first stripping roller and the first curing device in the first processing unit onto a first secondary wallboard capable of moving on a first main wallboard;

installing the second pressure roller, the second stripping roller and the second curing device in the second processing unit onto a second secondary wallboard capable of moving on a second main wallboard;

providing a first slide rail between the first wallboard and the first secondary wallboard, so that the first secondary wallboard moves up and down through the first slide rail, by means of a first lifting control device;

providing a second slide rail between the second main wallboard and the second secondary wallboard, so that the second secondary wallboard moves up and down through the second slide rail by means of a second lifting control device;

wherein the first film and the first impression cylinder can run in different directions without rubbing, and the second film and the second impression cylinder can run in different directions without rubbing, wherein the first secondary wallboard can move up and the first film can be separated from the first impression cylinder, and the second secondary wallboard can move up and the second film can be separated from the second impression cylinder.

14. The printing processing process according to claim 12, further comprises the following steps:

throwing the first processing unit onto the first impression cylinder to transfer the first texture of the first film onto the base material, wherein the first unreeling device unreels the first film and the first reeling device reels the first film;

coating the base material with the coating unit; and throwing the second processing unit onto the second impression cylinder to transfer the second texture of the second film onto the base material, wherein the second unreeling device unreels the second film and the second reeling device reels the second film wherein when the second processing unit is thrown onto the base material, the first processing unit is kept thrown on.

\* \* \* \* \*